(12) United States Patent
Xi

(10) Patent No.: US 12,013,629 B1
(45) Date of Patent: Jun. 18, 2024

(54) INTEGRAL IRIS DIAPHRAGM COVER PLATE STRUCTURE FOR PHONE LENS

(71) Applicant: Guangdong Yupin Industrial Co., Ltd, Dongguan (CN)

(72) Inventor: Longlong Xi, Dongguan (CN)

(73) Assignee: Guangdong Yupin Industrial Co., Ltd, Dongguan (CN)

(*) Notice: Subject to any disclaimer, the term of this patent is extended or adjusted under 35 U.S.C. 154(b) by 0 days.

(21) Appl. No.: 18/394,896

(22) Filed: Dec. 22, 2023

(30) Foreign Application Priority Data

Nov. 7, 2023 (CN) .......................... 202311470261.5

(51) Int. Cl.
| | | |
|---|---|---|
| G03B 9/06 | (2021.01) | |
| G02B 1/11 | (2015.01) | |
| G02B 1/12 | (2006.01) | |
| G02B 5/00 | (2006.01) | |
| G03B 11/04 | (2021.01) | |
| G03B 17/12 | (2021.01) | |
| G03B 30/00 | (2021.01) | |

(52) U.S. Cl.
CPC ................. *G03B 9/06* (2013.01); *G02B 1/11* (2013.01); *G02B 1/12* (2013.01); *G02B 5/005* (2013.01); *G03B 11/043* (2013.01); *G03B 17/12* (2013.01); *G03B 30/00* (2021.01)

(58) Field of Classification Search
CPC ..................................... G03B 9/02; G02B 5/22
See application file for complete search history.

(56) References Cited

U.S. PATENT DOCUMENTS 4,970,781 A * 11/1990 Chang .................. H01R 43/205
    29/721
11,467,368 B2 * 10/2022 Lee ......................... G03B 30/00
(Continued)

FOREIGN PATENT DOCUMENTS

| CN | 113099080 A | 7/2021 |
| CN | 216721448 U | 6/2022 |

(Continued)

OTHER PUBLICATIONS

Li, Zhongyang, Edgar Palacios, Serkan Bütün, Hasan Koçer, and Koray Aydin. 2015. "Omnidirectional, Broadband Light Absorption Using Large-area, Ultrathin Lossy Metallic Film Coatings." Scientific Reports 5 (1). https://doi.org/10.1038/srep15137. (Year: 2015).*

*Primary Examiner* — Leon W Rhodes, Jr.
(74) *Attorney, Agent, or Firm* — Nitin Kaushik

(57) ABSTRACT

The present invention belongs to the technical field of optical lenses. The integral iris diaphragm cover plate structure includes a cover plate main body and a support frame, where the support frame extends upwards from the cover plate main body, is integrated with the cover plate main body and is formed by a stamping and drawing process, the cover plate main body and the support frame are both made of metal, and a surface of the cover plate main body is subjected to surface roughening treatment and black coating treatment; a light through hole is formed in a central area of the cover plate main body, and semi-etched grooves used as position avoidance grooves are formed in a plane close to the support frame, of the cover plate main body through an etching process; and buckling holes and/or clamping grooves are formed in an upper edge of the support frame.

8 Claims, 8 Drawing Sheets

(56) References Cited

U.S. PATENT DOCUMENTS

| | | | |
|---|---|---|---|
| 11,733,588 B1* | 8/2023 | Chen | G03B 9/22 |
| | | | 396/452 |
| 2007/0103910 A1* | 5/2007 | Brickey | G02B 5/0268 |
| | | | 362/311.04 |
| 2021/0109305 A1* | 4/2021 | Hu | G02B 5/005 |

FOREIGN PATENT DOCUMENTS

| | | | | |
|---|---|---|---|---|
| CN | 116047835 A | 5/2023 | | |
| RU | 2672655 C2 * | 11/2018 | | C25D 5/12 |

* cited by examiner

INTEGRAL IRIS DIAPHRAGM COVER PLATE STRUCTURE FOR PHONE LENS

CROSS-REFERENCE TO RELATED APPLICATIONS

The application claims priority to Chinese patent application No. 202311470261.5, filed on Nov. 7, 2023, the entire contents of which are incorporated herein by reference.

TECHNICAL FIELD

The present invention belongs to the technical field of optical lenses, and particularly relates to an integral iris diaphragm cover plate structure for a phone lens.

BACKGROUND

In the field of a phone lens, a diaphragm defines how much light can pass through small holes of the lens to shine into CMOS photosensitive components at a bottom layer of a camera per unit of time. By adjusting diaphragm size, an exposure level can be controlled.

In order to achieve different exposure levels, phone industry has introduced variable diaphragms. A large diaphragm is used to increase an amount of light entering the lens at night/under low light conditions, making a bright shooting effect; and when taking a group photo with multiple people during the day, using a small diaphragm can ensure that both front and back figures are clear, and edges of an image are rich in details. In high magnification zoom scenes, using the large diaphragm can further improve image quality and capture clear and sharp images.

In the prior art, an iris diaphragm cover plate generally has two types of structures, namely a split type structure in which a cover plate main body and a plastic support frame are buckled and connected, and a complex process is adopted; an injection molding integrated type structure in which the plastic cover plate main body and the plastic support frame are subjected to integral injection molding through an integral injection molding process, but the injection molding integrated type structure has poorer strength compared to metal, resulting in a shorter service life.

In view of this, the present invention aims to provide an integral iris diaphragm cover plate structure for a phone lens. Through clever structural design and clever production processes, an integrated cover plate which is low in reflectivity and can achieve a good fixation effect on the iris diaphragm can be obtained.

SUMMARY

In view of defects exiting in the prior art, the present invention aims to provide an integral iris diaphragm cover plate structure for a phone lens. Through clever structural design and clever production processes, an integrated cover plate which is low in reflectivity and can achieve a good fixation effect on an iris diaphragm can be obtained.

In order to realize the purposes mentioned above, the present invention adopts the following technical solution:

an integral iris diaphragm cover plate structure for a phone lens includes a cover plate main body and a support frame, where the support frame extends upwards from the cover plate main body, is integrated with the cover plate main body and is formed by a stamping and drawing process, the cover plate main body and the support frame are both made of metal, and a surface of the cover plate main body is subjected to surface roughening treatment and black coating treatment;

a light through hole is formed in a central area of the cover plate main body, and semi-etched grooves used as position avoidance grooves are formed in an upper surface of the cover plate main body through an etching process; and buckling holes and/or clamping grooves are formed in an upper edge of the support frame.

As an improvement on the integral iris diaphragm cover plate structure for a phone lens, a thickness of a main body of the cover plate main body is 0.1 mm-0.4 mm, a depth of each semi-etched grooves is 0.05 mm-0.39 mm, and a thickness of a main body of the support frame is 0.1 mm-0.4 mm.

As an improvement on the integral iris diaphragm cover plate structure for a phone lens, the cover plate main body and the support frame are both made of an aluminum alloy, a copper alloy, or stainless steel.

As an improvement on the integral iris diaphragm cover plate structure for a phone lens, each semi-etched groove comprises a circular groove alternately formed around an outer edge of the light through hole and a trapezoidal groove or a waist-shaped groove with arc-shaped transitions at four corners.

As an improvement on the integral iris diaphragm cover plate structure for a phone lens, the buckling holes, the clamping grooves and the light through hole are all obtained through a stamping process; and an edge of the light through hole is chamfered through the etching process.

As an improvement on the integral iris diaphragm cover plate structure for a phone lens, a Ra value after surface roughening treatment is 0.2-3 µm, and reflectivity after black coating treatment is less than 0.3%.

As an improvement on the integral iris diaphragm cover plate structure for a phone lens, fool-proofing planes are formed on a side wall of the support frame.

As an improvement on the integral iris diaphragm cover plate structure for a phone lens, a manufacturing process I of the integral iris diaphragm cover plate structure includes the steps:

a first step: forming a front structure, where the front structure includes a light through hole, an area of a cover plate main body, arranged around the light through hole, and an area of a support frame, enclosed around the area of the cover plate main body, and a thickness of the area of the support frame is smaller than that of the area of the cover plate main body, and then performing surface roughening treatment on the front structure;

a second step: forming semi-etched grooves in the area of the cover plate main body through an etching process, and forming the front structure with the cover plate main body;

a third step: forming the support frame with a stamping and drawing process, where the support frame extends upwards from the cover plate main body and is integrated with the cover plate main body, specifically, while the cover plate main body is pressed under a stamping die, the area of the support frame extends upwards in a gap of the stamping die to form the support frame, and besides, the die horizontally extends out of a cutting module to punch the buckling holes and/or the clamping grooves in an upper edge of the support frame; and a fourth step: removing burrs and performing black coating on the cover plate main body to form the integral iris diaphragm cover plate structure for a phone lens.

A manufacturing process II of the integral iris diaphragm cover plate structure includes the steps:

a first step: forming the support frame with the stamping and drawing process, where the support frame extends upwards from the area of the cover plate main body and is integrated with the area of the cover plate main body, specifically, while the area of the cover plate main body is pressed under a stamping die, the area of the support frame extends upwards in a gap of the stamping die to form the support frame, and besides, the die horizontally extends out of a cutting module to punch the buckling holes and/or the clamping grooves in an upper edge of the support frame, a second step: forming semi-etched grooves in the area of the cover plate main body through an etching process to obtain a semi-finished product;

a third step: performing surface roughening treatment on the semi-finished product, and synchronously removing burrs; and a fourth step: performing black coating on the cover plate main body to form the integral iris diaphragm cover plate structure for a phone lens.

As an improvement on the integral iris diaphragm cover plate structure for a phone lens, surface roughening treatment includes sprinkling dilute hydrochloric acid with a mass concentration of 5-8% at a sprinkling pressure of 0.2-0.3 MPa onto a material of the cover plate main body;

the etching process includes: performing laminating operation on photosensitive ink on the material of the cover plate main body at a pressure of 3-4 kg, a speed of 1-2 meters per minute, and a temperature of 90-100° C., then, performing ultraviolet radiation on a reserved area of the cover plate main body with an energy of 80-100 mj, performing development operation with a mass concentration of 5-6%, at a sprinkling pressure of 0.2-0.3 MPa, and a temperature of 40-50° C. to remove the photosensitive ink from an etched area, then performing etching operation with acid to form the required semi-etched grooves, and finally, sprinkling sodium hydroxide with a mass concentration of 4-7% at a sprinkling pressure of 0.2-0.3 MPa and a temperature of 35-55° C. to an etched structure to remove the photosensitive ink from a non-etched area;

black coating treatment includes: performing black coating treatment on the deburred cover plate main body by a vacuum coating process; firstly, making a vacuum degree of a film coating chamber reach $5.0\ e^{-7}$ Torr-$1.0^{-6}$ Torr, inflating Ar to make the vacuum degree reach $5.0\ e^{-5}$ Torr-$3.0\ E^{-3}$ Torr, and activating an ion source to perform plasma cleaning treatment on a surface of a coated product to enhance adhesion between a film layer and the product, where cleaning time is 30-300 seconds, and cleaning power is 100-3000 W; and performing alternating coating with materials with different refractive indices, at a temperature of 50-150° C., with a total thickness of 100-500 nm, and finally, obtaining an iris diaphragm cover plate with a surface reflectivity less than 0.3%, where the materials with different refractive indices are at least two of Cr, Ti, Si, Ta, Nb, $Ti_3O_5$, $SiO_2$, $TiO_2$, $Nb_2O_5$, and $Al_2O_3$.

Compared with the prior art, through clever structural and technological design, an iris diaphragm cover plate structure adopting an integral metal material, for a phone lens, can be obtained, and the integral iris diaphragm cover plate structure is manufactured by using the etching process, the stamping and drawing process and the black coating process. The processes are simple, intensity is high, the semi-etched grooves can achieve position avoidance and weight reduction, the buckling holes and the clamping grooves can achieve position limitation and fool proofing, the fool-proofing plane not only can achieve the effect of fool proofing, but also can reserve space for other parts, besides, the support frame formed by an etching and thinning process and the stamping and drawing process is thinned, and weight can be reduced (thinning can also be omitted). In addition, the black coating treatment can also reduce surface reflectivity, presenting a black hole effect on a product surface, and reducing stray light, and final reflectivity is less than 0.3%. Color can be adjusted according to needs.

In addition, a film layer produced by the black coating process of the present invention has a thin thickness of only 0.0005 mm, with almost no increase in weight. However, by using other existing processes, such as a coating process, the film layer has a thickness of approximately 0.015-0.025 mm and a minimum reflectivity of only 0.3%, white by using an electrophoresis process, the film layer has a thickness of about 0.015 mm and there will be thickness changes throughout the entire surface, affecting product size and increasing weight significantly. The minimum reflectivity is about 0.7%, and high reflectivity can cause the stray light when photos are taken with the lens.

DETAILED DESCRIPTION OF THE EMBODIMENTS

Figure 1:
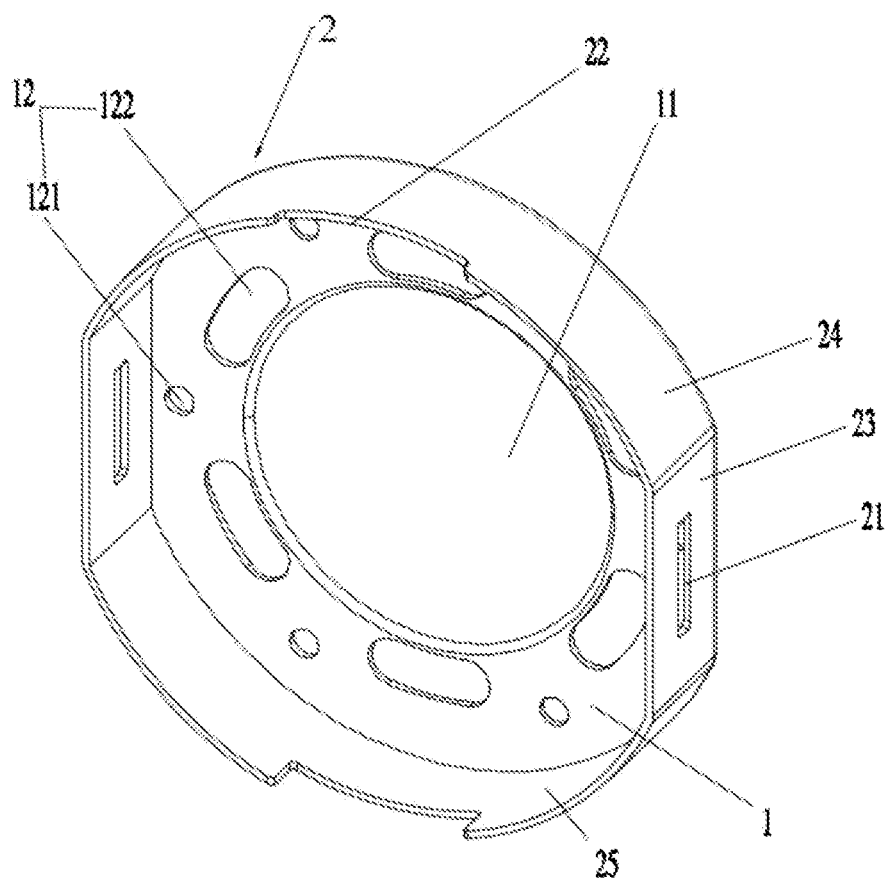
FIG. 1 is a perspective structural diagram 1 of the present invention.
Figure 2:
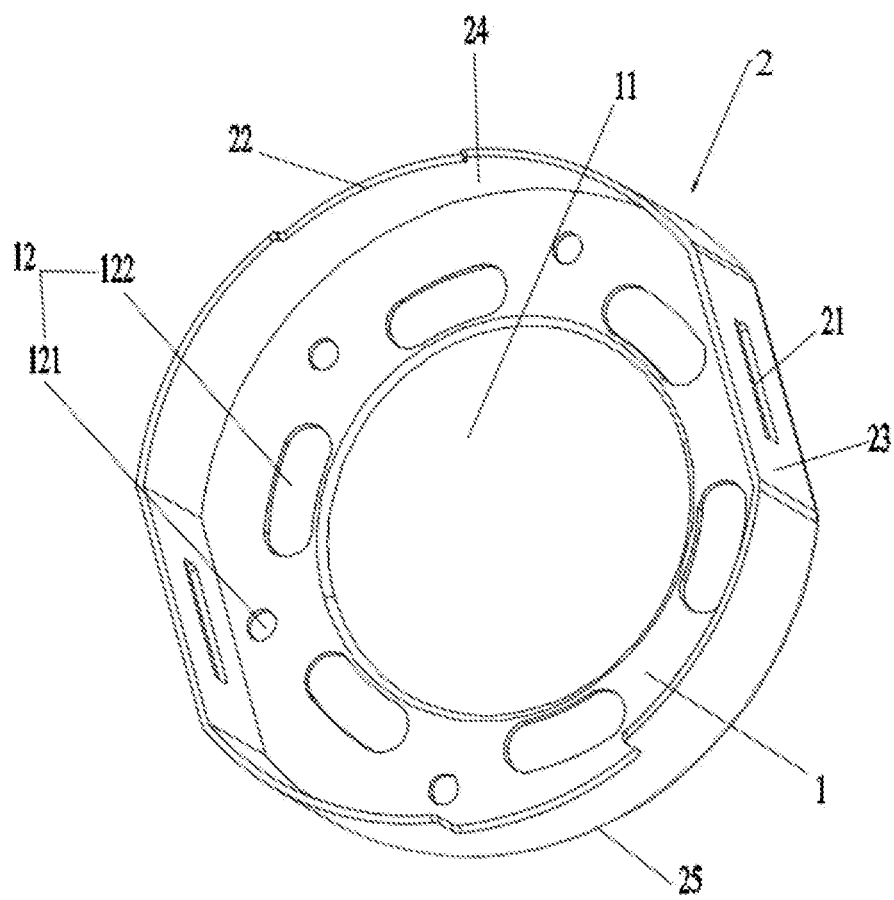
FIG. 2 is a perspective structural diagram II of the present invention.
Figure 3:
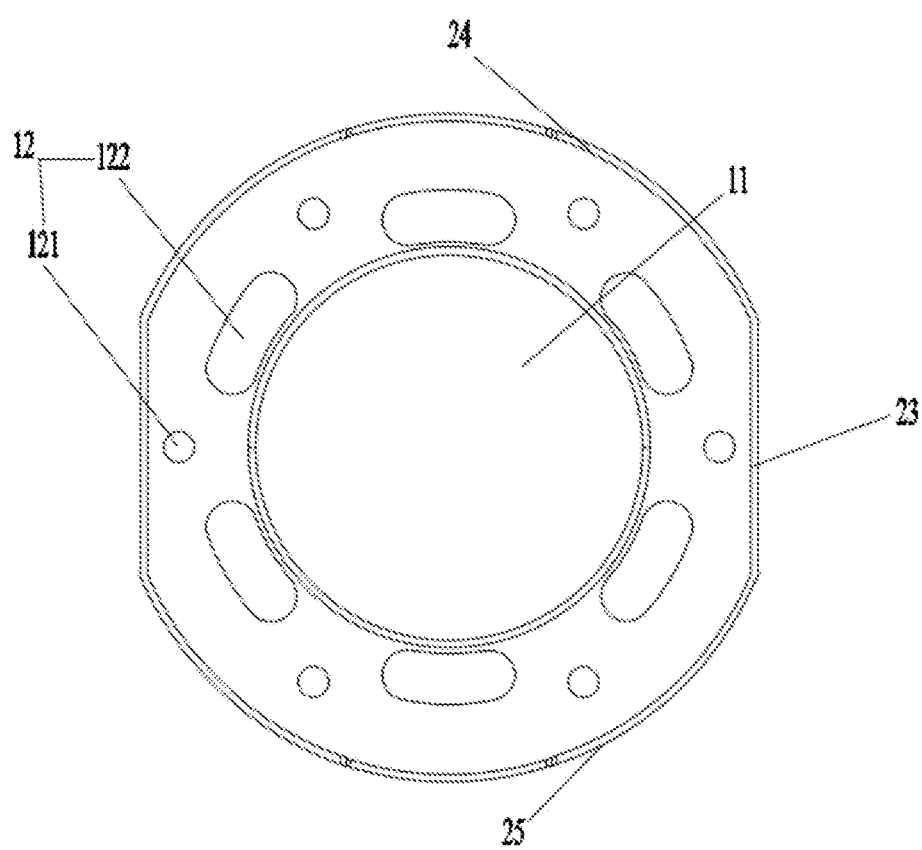
FIG. 3 is a front view of the present invention.
Figure 4:
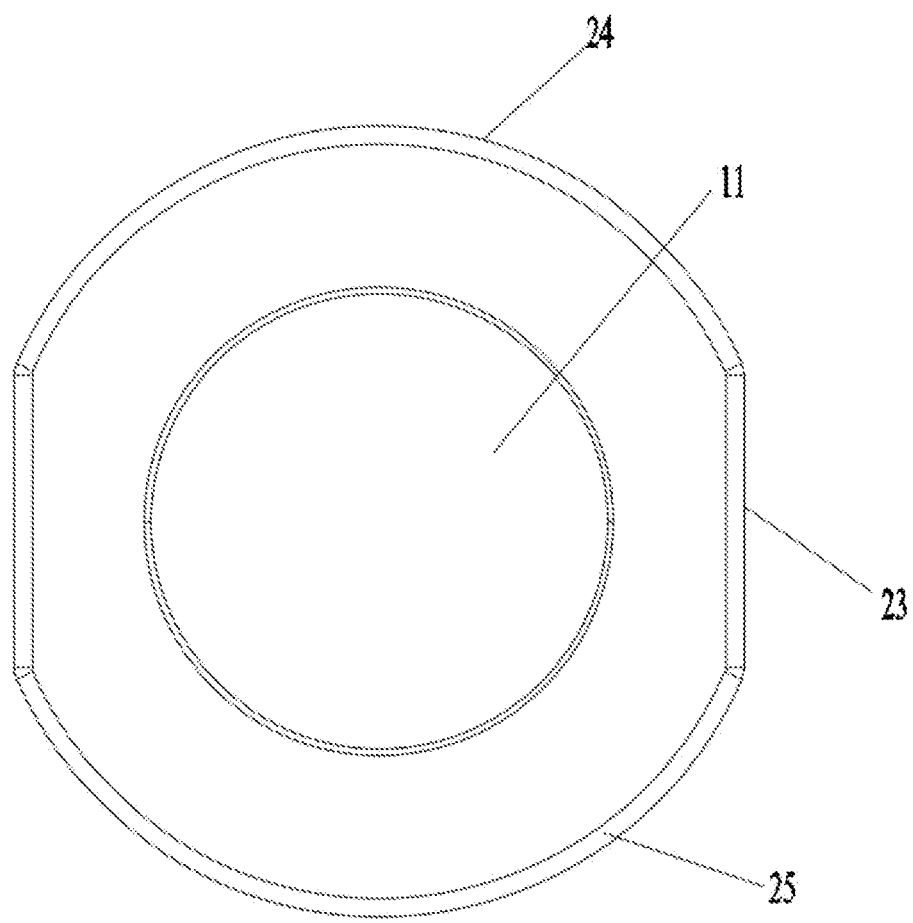
FIG. 4 is a rear view of the present invention.
Figure 5:
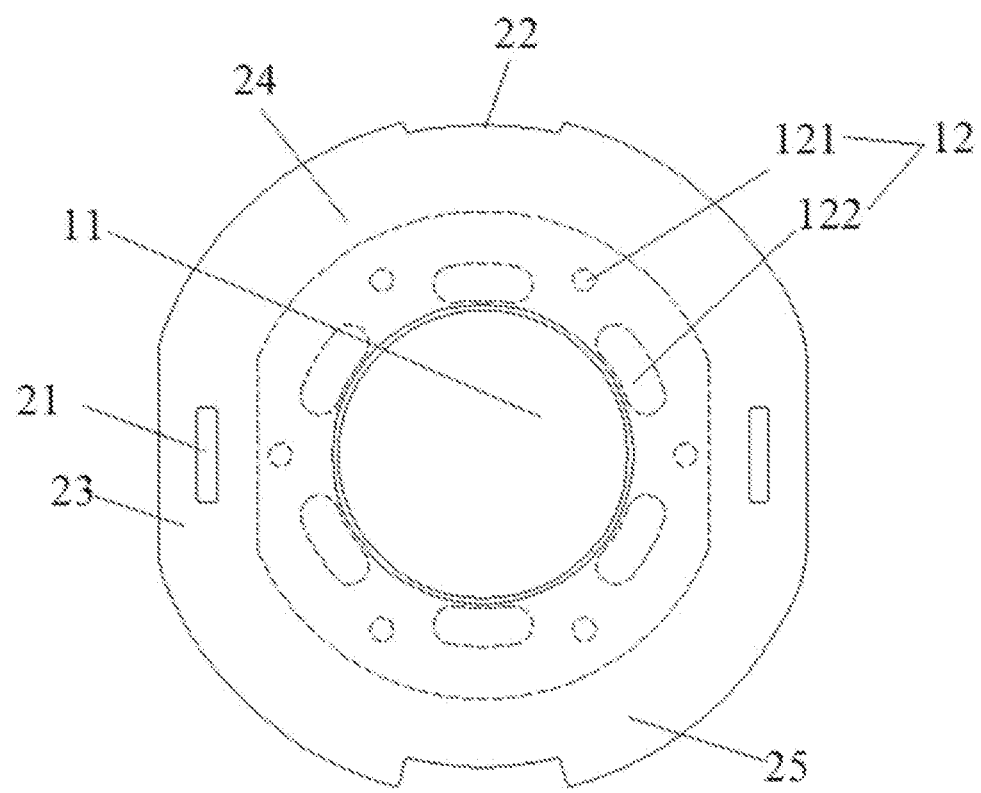
FIG. 5 is an exploded structural diagram of the present invention.

The following are specific embodiments to illustrate the technical solution of the present invention, but the scope of protection of the present invention is not limited to this.

As shown in FIGS. 1-5, the present invention provides an integral iris diaphragm cover plate structure for a phone lens, includes a cover plate main body 1 and a support frame 2, where the support frame 2 extends upwards from the cover plate main body 1, is integrated with the cover plate main body 1 and is formed by a stamping and drawing process, the cover plate main body 1 and the support frame 2 are both made of metal, the integral iris diaphragm cover plate structure made of metal is high in intensity and long in service life, and a surface of the cover plate main body 1 is subjected to surface roughening treatment and black coating treatment; and a Ra value after surface roughening treatment is 0.2-3 µm, and reflectivity after black coating treatment is less than 0.3%.

The black coating treatment can also reduce surface reflectivity, presenting a black hole effect on a product surface, and reducing stray light, and final reflectivity is less than 0.3%. The color is the same as the black coating color on a lens head. In addition, a film layer produced by the black coating process of the present invention has a thin thickness of only 0.0005 mm, with almost no increase in weight. However, by using other existing processes, such as a coating process, the film layer has a thickness of approximately 0.015-0.025 mm and a minimum reflectivity of only 0.3%, while by using an electrophoresis process, the film layer has a thickness of about 0.015 mm and there will be thickness changes throughout the entire surface, affecting product size and increasing weight significantly. The minimum reflectivity is about 0.7%, and high reflectivity can cause the stray light when photos are taken with the lens.

A light through hole 11 is formed in a central area of the cover plate main body 1, and semi-etched grooves 12 which are used as position avoidance grooves and achieve the effects of position avoidance and weight reduction are formed in an upper surface of the cover plate main body 1 through an etching process; and buckling holes 21 and clamping grooves 22 are formed in an upper edge of the support frame 2, so as to connect the support frame 2 with other components, and achieve the effect of limiting and fool proofing. In the embodiment, two clamping grooves 22 and two buckling holes 21 are formed (although the number can also be more than two).

A thickness of a main body of the cover plate main body 1 is 0.1 mm-0.4 mm, a depth of each semi-etched groove 12 is 0.05-0.39 mm, and a thickness of a main body of the support frame 2 is 0.1-0.4 mm. The thickness of the main body of the support frame 2 is less than or equal to the thickness of the main body of the cover plate main body 1, which can reduce weight while ensuring strength.

The cover plate main body 1 and the support frame 2 are both made of an aluminum alloy, a copper alloy, or stainless steel which can be stamped and drawn. In the drawing course, the thickness of the support frame 2 is further reduced.

Each semi-etched groove 12 includes circular grooves 121 alternately formed around an outer edge of the light through hole 11 and trapezoidal grooves 121 (or waist-shaped grooves) with arc-shaped transitions at four corners. These semi-etched grooves 12 are all designed to avoid protruding structures of other components, and reduce assembly volumes thereof and other components.

The buckling holes 21, the clamping grooves 22, and the light through hole 11 are all obtained through a stamping process, but are not formed in the same stamping course; and an edge of the light through hole 11 is chamfered through an etching process to reduce stray light, reduce a reflection area, change a reflection angle, and lower reflectivity, thereby achieve a better imaging effect.

Two fool-proofing planes 23 are formed on a side wall of the support frame 2, which not only play a fool-proofing role (preventing reverse installation), but also reduce a volume of an entire cover plate structure, making space for other components of the phone. In the embodiment, two ends of the two fool-proofing planes 23 are respectively connected by a first arc-shaped surface 24 and a second arc-shaped surface 25, and two clamping grooves 22 are respectively formed in upper edges of the first arc-shaped surface 24 and the second arc-shaped surface 25; and the two buckling holes 21 are respectively formed in upper edges of the two fool-proofing planes 23.

The following two embodiments provide different manufacturing methods.

Embodiment 1

Figure 6:
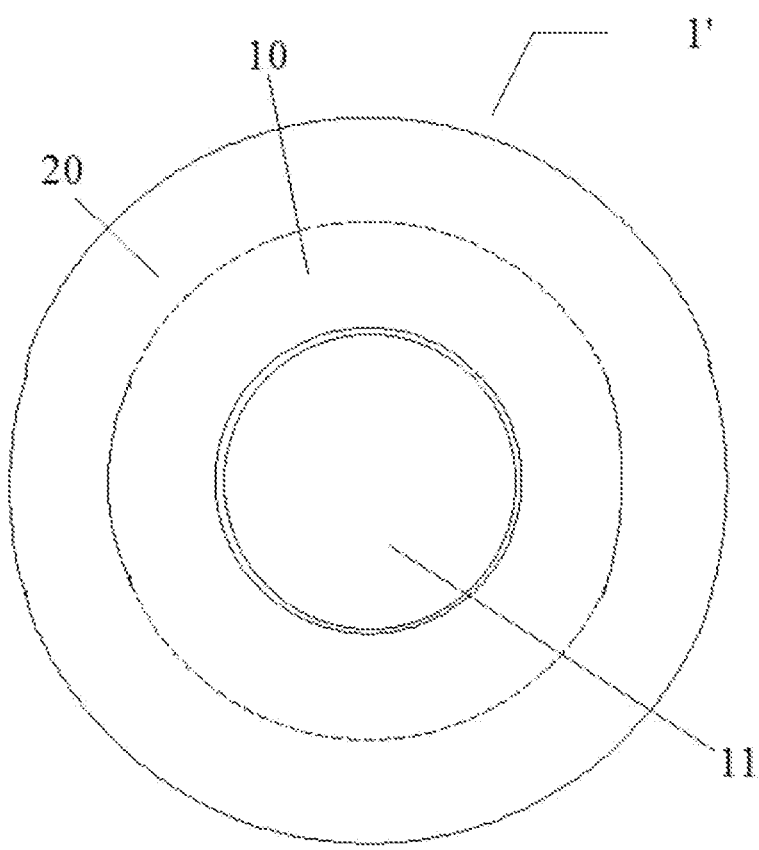
FIG. 6 is a structural diagram of a top view of a front structure in a first step of embodiment 1 of the present invention.
Figure 7:
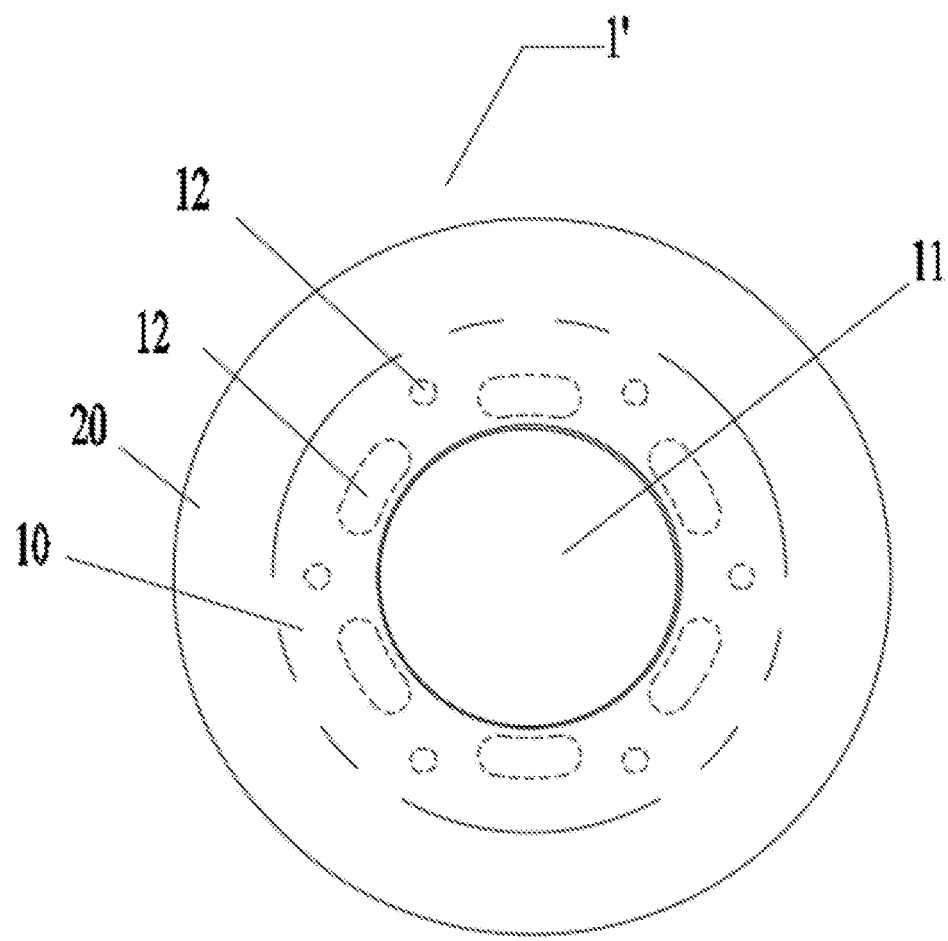
FIG. 7 is a structural diagram of a top view of a front structure with a cover plate main body in a first step of embodiment 1 of the present invention.

A manufacturing process of an integral iris diaphragm cover plate structure for a phone lens provided by the present invention includes:

a first step: forming a front structure 1' (as shown in FIG. 6), where the front structure 1' includes a light through hole 11, an area 10 of a cover plate main body, arranged around the light through hole 11, and an area 20 of a support frame, enclosed around the area 10 of the cover plate main body, and a thickness of the area 20 of the support frame is smaller than that of the area 10 of the cover plate main body, and then performing surface roughening treatment on the front structure 1';

a second step: forming semi-etched grooves 12 in the area 10 of the cover plate main body through an etching process, and forming the front structure 1' with the cover plate main body 1 (as shown in FIG. 7);

a third step: forming the support frame 2 with the stamping and drawing process, where the support frame 2 extends upwards from the cover plate main body 1 and is integrated with the cover plate main body 1, specifically, while the cover plate main body 1 is pressed under a stamping die, the area of the support frame extends upwards in a gap of the stamping die and thins (thinning can also be omitted) to form the support frame 2 with two fool-proofing planes 23, and besides, the die horizontally extends out of a cutting module to punch the buckling holes 21 and the clamping grooves 22 in an upper edge of the support frame 2; and a fourth step: removing burrs and performing black coating on the cover plate main body 1 to form the integral iris diaphragm cover plate structure for a phone lens.

In the first step, surface roughening treatment includes sprinkling dilute hydrochloric acid with a mass concentration of 5-8% at a sprinkling pressure of 0.2-0.3 MPa onto a material of the cover plate main body;

in the second step, the etching process includes: performing laminating operation on photosensitive ink on the material of the cover plate main body at a pressure of 3-4 kg, a speed of 1-2 meters per minute, and a temperature of 90-100° C., then, performing ultraviolet radiation on a reserved area of the cover plate main body with an energy of 80-100 mj, performing development operation with a mass concentration of 5-6%, at a sprinkling pressure of 0.2-0.3 MPa. and a temperature of 40-50° C. to remove the photosensitive ink from the etched area, then performing etching operation with acid to form the required semi-etched grooves, and finally, sprinkling sodium hydroxide with a mass concentration of 4-7% at a sprinkling pressure of 0.2-0.3 MPa and a temperature of 35-55° C. to an etched structure to remove the photosensitive ink from a non-etched area;

in the fourth step, black coating treatment includes: performing black coating treatment on the deburred cover plate main body by a vacuum coating process; firstly, making a vacuum degree of a film coating chamber reach $5.0\ e^{-7}$ Torr-$1.0^{-6}$ Torr, inflating Ar to make the vacuum degree reach $5.0\ e^{-5}$ Torr-$3.0\ E^{-3}$ Torr, and activating an ion source to perform plasma cleaning treatment on a surface of a coated product to enhance adhesion between a film layer and the product, where cleaning time is 30-300 seconds, and cleaning power is 100-3000 W; and performing alternating coating with materials with different refractive indices, at a temperature of 50-150° C., with a total thickness of 100-500 nm, and finally, obtaining an iris diaphragm cover plate with a surface reflectivity less than 0.3%, where the materials with different refractive indices are at least two of Cr, Ti, Si, Ta, Nb, $Ti_3O_5$, $SiO_2$, $TiO_2$, $Nb_2O_5$, and $Al_2O_3$.

The integral iris diaphragm cover plate structure is manufactured by using the etching process, the stamping and drawing process and the black coating process. The processes are simple and easy to realize, the support frame formed by the stamping and drawing process is thinned, and weight can be reduced (thinning can also be omitted).

Embodiment 2

Figure 8:
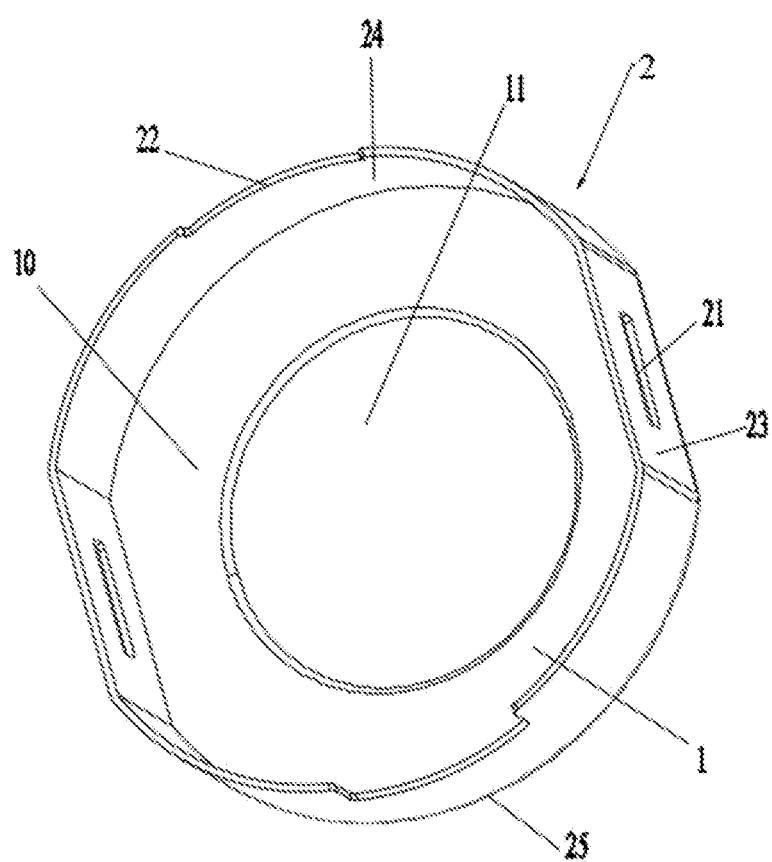
FIG. 8 is a structural diagram of a structure formed in step I of the embodiment 2 of the present invention.

A manufacturing process of an integral iris diaphragm cover plate structure for a phone lens provided by the present invention includes:
  a first step: forming the support frame 2 through the stamping and drawing process for the structure as shown in FIG. 6, where the support frame extends upwards from the area 10 of the cover plate main body and is integrated with the area 10 of the cover plate main body, specifically, while the area 10 of the cover plate main body is pressed under a stamping die, the area 20 of the support frame extends upwards in a gap of the stamping die to form the support frame 2, besides, the die horizontally extends out of a cutting module to punch the buckling holes 21 and the clamping grooves 22 in an upper edge of the support frame 2, and besides, the fool-proofing planes 23, the first arc-shaped surface 24 and the second arc-shaped surface 25 are formed (as shown in FIG. 8);
  a second step: forming semi-etched grooves 12 in an area 10 of the cover plate main body through an etching process to obtain a semi-finished product;
  a third step: performing surface roughening treatment on the semi-finished product, and synchronously removing burrs; and
  a fourth step: performing black coating on the cover plate main body 1 to form the integral iris diaphragm cover plate structure for a phone lens.

According to the disclosure and teachings in the specification, those skilled in the art of the present invention may also make changes and modifications to the aforementioned embodiments. Therefore, the present invention is not limited to the specific embodiments disclosed and described above, and some modifications and changes to the thickness and material of the present invention should also fall within the scope of protection of the claims of the present invention. Furthermore, although certain specific terms are used in the specification, they are only for convenience of explanation and do not constitute any limitation on the present invention.

What is claimed is:

1. An integral iris diaphragm cover plate structure for a phone lens, comprising a cover plate main body and a support frame, wherein the support frame extends upwards from the cover plate main body, is integrated with the cover plate main body and is formed by a stamping and drawing process, the cover plate main body and the support frame are both made of metal, and a surface of the cover plate main body is subjected to surface roughening treatment and black coating treatment;
  a light through hole is formed in a central area of the cover plate main body, and semi-etched grooves used as position avoidance grooves are formed in an upper surface of the cover plate main body through an etching process, wherein each semi-etched groove comprises a circular groove alternately formed around an outer edge of the light through hole and a trapezoidal groove or a waist-shaped groove with arc-shaped transitions at four corners; and
  buckling holes and/or clamping grooves are formed in an upper edge of the support frame.

2. The integral iris diaphragm cover plate structure for a phone lens according to claim 1, wherein a thickness of a main body of the cover plate main body is 0.1 mm-0.4 mm, a depth of each semi-etched grooves is 0.05 mm-0.39 mm, and a thickness of a main body of the support frame is 0.1 mm-0.4 mm.

3. The integral iris diaphragm cover plate structure for a phone lens according to claim 1, wherein the cover plate main body and the support frame are both made of an aluminum alloy, a copper alloy, or stainless steel.

4. The integral iris diaphragm cover plate structure for a phone lens according to claim 1, wherein the buckling holes, the clamping grooves and the light through hole are all obtained through a stamping process; and an edge of the light through hole is chamfered through the etching process.

5. The integral iris diaphragm cover plate structure for a phone lens according to claim 1, wherein a Ra value after surface roughening treatment is 0.2-3 μm.

6. The integral iris diaphragm cover plate structure for a phone lens according to claim 1, wherein fool-proofing planes are formed on a side wall of the support frame.

7. The integral iris diaphragm cover plate structure for a phone lens according to claim 1, wherein a manufacturing process of the integral iris diaphragm cover plate structure comprises the steps:
  a first step: forming a front structure, wherein the front structure comprises a light through hole, an area of a cover plate main body, arranged around the light through hole, and an area of a support frame, enclosed around the area of the cover plate main body, and a thickness of the area of the support frame is smaller than that of the area of the cover plate main body, and then performing surface roughening treatment on the front structure;
  a second step: forming semi-etched grooves in the area of the cover plate main body through an etching process, and forming the front structure with the cover plate main body;
  a third step: forming the support frame with a stamping and drawing process, where the support frame extends upwards from the cover plate main body and is integrated with the cover plate main body, specifically, while the cover plate main body is pressed under a stamping die, the area of the support frame extends upwards in a gap of the stamping die to form the support frame, and besides, the die horizontally extends out of a cutting module to punch the buckling holes and/or the clamping grooves in an upper edge of the support frame; and
  a fourth step: removing burrs and performing black coating on the cover plate main body to form the integral iris diaphragm cover plate structure for a phone lens.

8. The integral iris diaphragm cover plate structure for a phone lens according to claim 1, wherein the manufacturing process of the integral iris diaphragm cover plate structure comprises the steps:
- a first step: forming the support frame with the stamping and drawing process, wherein the support frame extends upwards from the area of the cover plate main body and is integrated with the area of the cover plate main body, specifically, while the area of the cover plate main body is pressed under a stamping die, the area of the support frame extends upwards in a gap of the stamping die to form the support frame, and besides, the die horizontally extends out of a cutting module to punch the buckling holes and/or the clamping grooves in an upper edge of the support frame;
- a second step: forming semi-etched grooves in the area of the cover plate main body through an etching process to obtain a semi-finished product;
- a third step: performing surface roughening treatment on the semi-finished product, and synchronously removing burrs; and
- a fourth step: performing black coating on the cover plate main body to form the integral iris diaphragm cover plate structure for a phone lens.

* * * * *